(12) United States Patent
Raether et al.

(10) Patent No.: US 6,815,498 B2
(45) Date of Patent: Nov. 9, 2004

(54) METHOD FOR PRODUCING A POLYMERIC CONVERSION PRODUCT

(75) Inventors: Roman Benedikt Raether, Limburgerhof (DE); Bernd Modery, Hochstadt (DE); Frank Braun, Niederkirchen (DE); Susanne Brinkmann-Rengel, Ober-Olm (DE); David Christie, Mannheim (DE); Sylke Haremza, Neckargemünd (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 7 days.

(21) Appl. No.: 10/149,744

(22) PCT Filed: Dec. 15, 2000

(86) PCT No.: PCT/EP00/12848

§ 371 (c)(1),
(2), (4) Date: Jun. 13, 2002

(87) PCT Pub. No.: WO01/44327

PCT Pub. Date: Jun. 21, 2001

(65) Prior Publication Data

US 2003/0018137 A1 Jan. 23, 2003

(30) Foreign Application Priority Data

Dec. 17, 1999 (DE) .......................... 199 61 063

(51) Int. Cl.$^7$ .......................... C08F 12/32; C08F 18/00
(52) U.S. Cl. .......................... 525/64; 525/263; 525/273; 525/241; 525/391; 526/292.5
(58) Field of Search .......................... 525/64, 263, 273, 525/241, 391; 526/292.5

(56) References Cited

U.S. PATENT DOCUMENTS 6,117,958 A * 9/2000 Ittel et al. ............ 526/161
6,506,836 B1 * 1/2003 Bremser et al. ............ 525/64

FOREIGN PATENT DOCUMENTS

| DE | 44 20 917 | 12/1995 |
|---|---|---|
| DE | 198 58 708 | 6/2000 |
| EP | 780 412 | 6/1997 |
| SU | 189575 | 1/1967 |
| WO | 92/13903 | 8/1992 |
| WO | 93/22351 | 11/1993 |
| WO | 93/22355 | 11/1993 |
| WO | 96/15157 | 5/1996 |
| WO | 98/01478 | 1/1998 |
| WO | 98/37104 | 8/1998 |

OTHER PUBLICATIONS

P. Cacioli et al.: "Copolymerization of w–unsaturated oligo(methyl methacrylate): new macromonomers" J. Macromol. Sci.–Chem., vol. A23, No. 7, pp. 839–825.
Roempp, 10 Auflage, S. 2503, 1998.
M. Klapper: "Methods of block copolymer synthesis" URL http://www.mpip–mainz.mpg.de/documents/projects98/E3.htm Accessed Aug. 23, 2001.
Caplus–Abstr. 1996:25365.
Caplus–Abstr. 1999:558882.

* cited by examiner

Primary Examiner—Sam A. Acquah
Assistant Examiner—Olga Asinovsky
(74) Attorney, Agent, or Firm—Oblon, Spivak, McClelland, Maier & Neustadt, P.C.

(57) ABSTRACT

A process for the preparation of a reaction product (A), which comprises the following stage (i):
(i) Reaction, under free radical conditions, of a reaction mixture comprising at least one monomer (a), capable of free radical reaction in the presence of at least one free radical initiator and a compound of the formula (I)

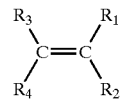

where $R_1$ to $R_4$, independently of one another, are each hydrogen, an alkyl radical, cycloalkyl radical or aralkyl radical, each of which is unsubstituted or substituted, an unsubstituted or substituted aromatic hydrocarbon radical, with the proviso that at least two of the radicals $R_1$ to $R_4$ are an unsubstituted or substituted aromatic hydrocarbon radical, or $R^1$ and $R^2$ or $R^3$ and $R^4$, in each case in pairs, are a substituted or unsubstituted aromatic hydrocarbon having 6 to 18 carbon atoms and a functional group which, in conjugation with the C—C double bond in the formula I, has a multiple bond between a carbon atom and a heteroatom,
10% by weight or less of water being present in the reaction mixture during the reaction.

40 Claims, No Drawings

METHOD FOR PRODUCING A POLYMERIC CONVERSION PRODUCT

The present invention relates to a process for the preparation of a reaction product (A) by reaction, under free radical conditions, of at least one monomer (a), capable of free radical polymerization, in the presence of at least one free radical initiator and a compound of the formula (I) as defined below, this reaction product per se, a process for the preparation of a polymer using this reaction product, and its use as a macroinitiator.

The present invention relates to the technical field of free radical polymerization which has features which are typical of a living polymerization system, the novel process being capable in principle of providing reaction products or polymers which may have a narrow molecular weight distribution ($M_w/M_n$). In addition, both straight-chain and branched homopolymers and copolymers as well as block copolymers can be prepared by an appropriate choice of monomers and, if required, successive addition of different monomers. The present invention relates not only to the polymers per se but also to a reaction product obtained in a first stage.

There has for some years been considerable interest in processes or process concepts which are suitable for the preparation of a multiplicity of polymers and make it possible to provide such polymers having a predetermined structure, molecular weight and molecular weight distribution.

Thus, WO 98/01478 describes a process for the preparation of polymers, in which the monomer to be reacted, which is chosen in particular from vinyl monomers and from acid derivatives having unsaturated groups, for example anhydrides, esters and imides of (meth)acrylic acid, is reacted in the presence of a free radical initiator and of a thiocarbonylthio compound as a chain-transfer agent.

WO 92/13903 describes a process for the preparation of polymers having a low molecular weight by free radical chain polymerization of one or more monomers in the presence of a group-transfer agent as defined therein, which has a C—S double bond. According to this publication, the compounds described there and having a C—S double bond act not only as chain-transfer agents but also as growth regulators, so that, according to this publication, it is only possible to prepare polymers having a low molecular weight in the presence of this compound.

A process for the free radical chain polymerization of unsaturated monomers in an aqueous medium and in the presence of a macromonomer having a terminal —CH$_2$—C(X)=CH$_2$ group, where X is as defined therein, is described in WO 93/22351. According to the examples of this application, various (meth)acrylates or (meth)acrylic acid and, if desired, monomers such as styrene are each reacted there under emulsion or suspension polymerization conditions.

WO 93/22355 relates to a process for the preparation of crosslinkable polymers using a macromonomer as described in WO 93/22351.

WO 96/15157 likewise describes a process for the preparation of polymers having a comparatively narrow molecular weight distribution, in which a vinyl monomer as defined therein is reacted with a macromonomer, which is likewise vinyl-terminated, in the presence of a free radical initiator.

Furthermore, WO 98/37104 relates to the preparation of polymers controlled with respect to the molecular weight, including those based on acrylate, by free radical polymerization of corresponding monomers using a chain-transfer agent defined in more detail therein and having a C—C double bond and radicals which activate this double bond with respect to the free radical addition of monomers.

A free radical chain polymerization or copolymerization with an ω-unsaturated oligo(methyl methacrylate) using ethyl acrylate, styrene, methyl methacrylate, acrylonitrile and vinyl acetate as copolymers is described in a scientific article in J. Macromol. Sci.-Chem., A 23 (7) (1986), 839–852.

In view of this prior art, it is an object of the present invention to provide a novel process for the preparation of a polymeric reaction product which leads in a simple and controlled manner to homopolymers and copolymers which can be prepared by a free radical method. It is a further object of the present invention to provide a process with the aid of which it is possible to prepare block copolymers which are obtainable only in an unsatisfactory manner, if at all, by other routes. It is furthermore an object of the present invention to permit properties of polymers to be established in a controlled manner and hence to permit a wide range of potential uses of such polymers which are obtainable by simple free radical polymerization.

We have found that this and further objects are achieved by the novel process as described below.

The present invention therefore relates to a process for the preparation of a reaction product (A), which comprises the following stage (i):

(i) Reaction, under free radical conditions, of a reaction mixture comprising
at least one monomer (a) capable of free radical polymerization,
at least one free radical initiator and
a compound of the formula (I)

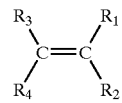

where $R_1$ to $R_4$, independently of one another, are each hydrogen, an alkyl radical, cycloalkyl radical or aralkyl radical, each of which is unsubstituted or substituted, a substituted or unsubstituted aromatic hydrocarbon radical, with the proviso that at least two of the radicals $R_1$ to $R_4$ are an unsubstituted or substituted aromatic hydrocarbon radical, or $R^1$ and $R^2$ or $R^3$ and $R^4$, in pairs in each case, are a substituted or unsubstituted aromatic hydrocarbon having 6 to 18 carbon atoms and a functional group which, in conjugation with the C—C double bond in the formula I, has a multiple bond between a carbon atom and a heteroatom, 10% by weight or less of water being present in the reaction mixture during the reaction.

The present invention furthermore relates to a reaction product (A) which can be prepared by means of a process comprising the following stage (i):

(i) Reaction, under free radical conditions, of a reaction mixture comprising at least one monomer (a), capable of free radical reaction, in the presence of at least one free radical initiator and of a compound of the formula (I)

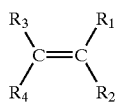

where $R_1$ and $R_4$, independently of one another, are each hydrogen, an alkyl radical, cycloalkyl radical or aralkyl radical each of which is unsubstituted or substituted, an unsubstituted or substituted aromatic hydrocarbon radical, with the proviso that at least two of the radicals $R_1$ to $R_4$ are a substituted or unsubstituted aromatic hydrocarbon radical, or $R^1$ and $R^2$ or $R^3$ and $R^4$, in pairs in each case, are a substituted or unsubstituted aromatic hydrocarbon having 6 to 18 carbon atoms and a functional group which, in conjugation with the C—C double bond in formula I, has a multiple bond between a carbon atom and a heteroatom, 10% by weight or less of water being present in the reaction mixture during the reaction.

In the above novel process, all monomers capable of free radical reaction may be used as monomer (a).

For example, compounds which are capable of free radical homopolymerization or copolymerization and comprise a hydrophilic group, e.g. a carboxyl group, can be used as monomers (a). In this case, the monomers (a) are hydrophilic monomers capable of free radical homopolymerization or copolymerization, i.e. monomers whose solubility in water is higher than that of styrene.

Of course, mixtures of different hydrophilic monomers can also be used as monomers (a) in the present invention.

In a further embodiment of the present invention, however, it is also possible to use monomers which are capable of free radical polymerization and have a water solubility which corresponds to or is even lower than that of styrene.

In addition, mixtures of at least one hydrophilic monomer and at least one hydrophobic monomer can also be polymerized by the novel process. Specific examples of monomers (a) are:

$C_1$- to $C_{20}$-alkyl and hydroxyalkyl esters of monoethylenically unsaturated $C_3$- to $C_{10}$-monocarboxylic acids or $C_4$- to $C_8$-dicarboxylic acids, for example methyl methacrylate, ethyl methacrylate, propyl methacrylate (all isomers), butyl methacrylate (all isomers), 2-ethylhexyl methacrylate, isobornyl methacrylate, methyl acrylate, ethyl acrylate, propyl acrylate (all isomers), butyl acrylate (all isomers), 2-ethylhexyl acrylate, isobornyl acrylate, benzyl acrylate, phenyl acrylate, stearyl acrylate, diethyl maleate, hydroxyethyl acrylate, hydroxypropyl acrylate, hydroxybutyl acrylate, furthermore (meth)acrylates of alkoxylated $C_1$- to $C_{18}$-alcohols which have been reacted with from 2 to 50 mol of ethylene oxide, propylene oxide, butylene oxide or mixtures thereof; benzyl methacrylate, phenyl methacrylate, stearyl methacrylate, methacrylonitrile, styrene, α-methylstyrene, acrylonitrile, functionalized methacrylates; acrylates and styrenes selected from glycidyl methacrylate, 2-hydroxyethyl methacrylate, hydroxypropyl methacrylate (all isomers), hydroxybutyl methacrylate (all isomers), dimethylaminoethyl methacrylate, triethylene glycol methacrylate, itaconic anhydride, itaconic acid, glycidyl acrylate, 2-hydroxyethyl methacrylate, diethylaminoethyl acrylate, triethylene glycol acrylate, methacrylamide, N-tert-butylmethacrylamide, N-n-butylmethacrylamide, N-methylolmethacrylamide, N-ethylolmethacrylamide, N-tert-butylacrylamide, N-butylacrylamide, N-methylolacrylamide, N-ethylolacrylamide, vinylbenzoic acid (all isomers), diethylaminostyrene (all isomers), α-methylvinylbenzoic acid (all isomers), diethylamino-α-methylstyrene (all isomers), p-methylstyrene, p-vinylbenzenesulfonic acid, trimethoxysilylpropyl methacrylate, triethoxysilylpropyl methacrylate, tributoxysilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate and vinyl butyrate, vinyl chloride, vinyl fluoride, vinyl bromide, vinyl alcohol, vinyl ethers of $C_1$- to $C_{18}$-alcohols, vinyl ethers of alkoxylated $C_1$- to $C_{18}$-alcohols and vinyl ethers of polyalkylene oxides, such as polyethylene oxide, polypropylene oxide or polybutylene oxide, monoethylenically unsaturated $C_3$- to $C_{10}$-monocarboxylic acids, their alkali metal salts and/or ammonium salts, for example acrylic acid, methacrylic acid, dimethylacrylic acid, ethylacrylic acid, allylacetic acid or vinylacetic acid, furthermore monoethylenically unsaturated $C_4$- to $C_8$-dicarboxylic acids, their monoesters, anhydrides, alkali metal salts and/or ammonium salts, for example maleic acid, fumaric acid, itaconic acid, mesaconic acid, methylenemalonic acid, citraconic acid, maleic anhydride, itaconic anhydride or methylmalonic anhydride; furthermore monoethylenically unsaturated monomers containing sulfo groups, for example allylsulfonic acid, styrenesulfonic acid, 2-acrylamido-2-methylpropanesulfonic acid, methallylsulfonic acid, vinylsulfonic acid, 3-sulfopropyl acrylate or 3-sulfopropyl methacrylate, furthermore monoethylenically unsaturated monomers containing phosphonic acid groups, for example vinylphosphonic acid, allylphosphonic acid or acrylamidoethylpropanephosphonic acid, furthermore amides and N-substituted amides of monoethylenically unsaturated $C_3$- to $C_{10}$-monocarboxylic acids or $C_4$- to $C_8$-dicarboxylic acids, for example acrylamide, N-alkylacrylamides or N,N-dialkylacrylamides, each having 1 to 18 carbon atoms in the alkyl group, such as N-methylacrylamide, N,N-dimethylacrylamide, N-tert-butylacrylamide or N-octadecylacrylamide, N-monomethylhexylmaleamide, N-monodecylmaleamide, diethylaminopropylmethacrylamide or acrylamidoglycollic acid; furthermore alkylaminoalkyl (meth)acrylates, for example dimethylaminoethyl acrylate, dimethylaminoethyl methacrylate, ethylaminoethyl acrylate, diethylaminoethyl methacrylate, dimethylaminopropyl acrylate or dimethylaminopropyl methacrylate; furthermore vinyl esters, such as vinyl formate, vinyl acetate or vinyl propionate, where these may also be present in hydrolyzed form after the polymerization; furthermore N-vinyl compounds, for example N-vinylpyrrolidone, N-vinylcaprolactam, N-vinylformamide, N-vinyl-N-methylformamide, 1-vinylimidazole or 1-vinyl-2furthermore vinyl ethers of $C_1$- to $C_{18}$-alcohols, vinyl ethers of alkoxylated $C_1$- to $C_{18}$-alcohols and vinyl ethers of polyalkylene oxides, such as polyethylene oxide, polypropylene oxide or polybutylene oxide, styrene or its derivatives, such as α-methylstyrene, indene, dicyclopentadiene, monomers which carry amino or imino groups, such as dimethylaminoethyl methacrylate, diethylaminoethyl acrylate, diethylaminopropylmethacrylamide or allylamine, monomers which carry quaternary ammonium groups, for example present as salts as obtained by reacting the basic amino function with acids, such as hydrochloric acid, sulfuric acid, nitric acid, formic acid or acetic acid, or in quaternized form (examples of suitable quaternizing agents are dimethyl sulfate, diethyl sulfate, methyl chloride, ethyl chloride or benzyl chloride), e.g. dimethylaminoethyl acrylate hydrochloride, diallyldimethylammonium chloride, dimethylaminoethyl acrylate methylchloride, dimethylaminoethylaminopropylmethacrylamide methosulfate, vinylpyridinium salts or 1-vinylimidazolium salts; monomers in which the amino groups and/or ammonium groups are liberated only after polymerization and subsequent hydrolysis, for example N-vinylformamide or N-vinylacetamide, and mixtures of two or more of the abovementioned monomers.

In a preferred embodiment, styrene or one or more of the abovementioned styrene derivatives, acrylic acid or methacrylic acid, a $C_1$–$C_4$-alkyl or $C_1$–$C_4$-hydroxyalkyl acrylate or methacrylate, vinyl acetate, one of the abovementioned vinyl ethers or a mixture of two or more thereof, a substituted or unsubstituted vinylpyrrolidone, a mixture of two or more thereof, or a mixture of this first monomer (a') with at least one further monomer (a) capable of free radical homopolymerization or copolymerization are used as a first monomer (a).

According to the invention, a compound of the formula (I)

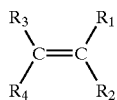

where $R_1$ to $R_4$ have the abovementioned meanings, is used in the preparation of the reaction product (A). In the context of the present invention, a heteroatom is understood as meaning an atom other than carbon, which is capable of forming multiple bonds (double or triple bonds) with a carbon atom.

In a preferred embodiment of the invention, 1, 1-diphenylethene, 1,1-dinaphthylethene, 4, 4-vinylidenebis (N,N'-dimethylaniline), 4, 4-vinylidenebis(aminobenzene), cis-stilbene, trans-stilbene, methyl α-phenylacrylate, methyl α-phenylmethacrylate, α-phenylacrylonitrile, α-phenylmethacrylonitrile or a mixture of two or more thereof are used as the compound of the formula I. In a further preferred embodiment of the invention, 1, 1-diphenylethene is used as the compound of the formula I.

Also suitable as compounds of the formula I are substituted diphenylethenes which are substituted on either one or both aromatic hydrocarbon radicals by electron-attracting or electron-displacing substituents, e.g. tert-butyl, benzyl or CN groups, or an alkoxydiphenylethylene, e.g. methoxy-, ethoxy- or tert-butoxydiphenylethylene, and the analogous thio or amino compounds are used.

The novel process is carried out in the presence of at least one free radical initiator, oxidizing free radical initiators being preferred here. Preferably, the initiator should be soluble in the solvent used or at least in the monomers used for the polymerization. In general, however, all azo and/or peroxo compounds conventionally used in the free radical chain polymerization may be employed.

Suitable initiators are described on page 10, line 17–34, of WO 98/01478, which is hereby fully incorporated by reference in the context of the present application.

In a preferred embodiment of the novel process, a comparatively large amount of free radical initiator is added, the proportion of free radical initiator in the reaction mixture being preferably from 0.5 to 50, particularly preferably from 1 to 20, % by weight, based in each case on the total amount of the monomer (a) and of the initiator. Preferably, the ratio of initiator to compound of the formula I is from 3:1 to 1:3, particularly preferably from 2:1 to 1:2, in particular from 1.5:1 to 1:1.5.

In the present invention, the reaction described above and according to stage (i) is carried out in an organic solvent or in the absence of a solvent, for example in the melt, in the presence of 10% by weight or less of water. In a preferred embodiment of the present invention, the water content of the reaction mixture is 5% by weight or less, for example less than about 3, 2 or 1% by weight. In a further preferred embodiment of the invention, the reaction mixture has a water content substantially below said values, for example less than about 0.5% by weight, based on the reaction mixture. In a further preferred embodiment of the invention, the reaction mixture is essentially free of water.

A reaction mixture essentially free of water is understood as meaning a reaction mixture which contains less than about 0.1% by weight of water, for example has a water content as usually found in commercially available solvents which are used as organic solvents in free radical polymerizations. In a further preferred embodiment of the invention, the reaction mixture is free of water, i.e. it has a water content of less than 0.001% by weight, based on the reaction mixture.

Suitable solvents in the context of the present invention are in principle all polar and nonpolar organic solvents in which the corresponding and preferably also the resulting polymers are soluble, if necessary at elevated temperatures. Suitable solvents are, for example, $C_3$- to $C_{10}$-alkanes, cyclohexane, decalin, acetone, methyl ethyl ketone, diisobutyl ketone, tetrahydrofuran, dioxane, benzene, toluene, glycols, such as ethylene glycol and triethylene glycol, glycol ethers in which some or all of the terminal groups are blocked, such as ethylene glycol monomethyl ether, ethyl acetate, methanol or ethanol, or the higher homologs of the alkanols of up to 18 carbon atoms (if required as cosolvent) or mixtures of two or more thereof.

The reaction according to stage (i) is carried out in general at above room temperature and below the decomposition temperature of the monomers, preferably within a temperature range from 50 to 150° C., particularly preferably from 70 to 120° C., in particular from 80 to 110° C., being chosen.

The reaction according to stage (i) is carried out in general at from 1 to 300, for example from about 1.5 to 100 or from about 2 to about 20 bar.

Although there are no restrictions at all with respect to the molecular weight distribution, a reaction product which has a molecular weight distribution $M_w/M_n$, measured by gel permeation chromatography using polystyrene as a standard, of $\leq 4$, preferably $\leq 3$, particularly preferably $\leq 2$, in particular $\leq 1.5$ and in individual cases also $\leq 1.3$ can be obtained in the reaction according to (i). The molecular weights of the reaction product (A) are controllable within wide limits by the choice of the ratio of monomers (a) to compounds (I) to free radical initiator. In particular, the content of compound (I) determines the molecular weight and does so by virtue of the fact that the greater the proportion of compound (I), the lower the molecular weight obtained.

The reaction product obtained in the reaction according to (i) can be further processed directly, for example can be used as a macroinitiator for the further reaction according to stage (ii), as defined further below. In addition, the reaction product according to stage (i) can be isolated as a solid and used.

In the novel process, the reaction product of stage (i) can be reacted, in a subsequent stage (ii), with a further monomer capable of free radical homopolymerization or copolymerization or with a mixture of two or more such monomers.

In such a reaction according to stage (ii), the reaction product of stage (i) can accordingly be reacted with at least one freely selectable monomer (b) capable of free radical homopolymerization or copolymerization. The monomer (b) may be identical to or different from the monomer (a) used in stage (i). The choice of the monomer (b) is made in principle according to the desired structure of the polymer prepared in stage (ii) and hence depending on the desired use of this polymer.

In principle, monomers mentioned in the description of the monomers (a) are suitable as monomers (b).

Accordingly, the present invention also relates to a process for the preparation of a polymer (B), which comprises:

Reaction of the reaction product (A) obtained in stage (i), under free radical conditions, in the presence of at least one monomer (b) capable of free radical homopolymerization or copolymerization.

The reaction according to stage (ii) is carried out in principle under the usual conditions for a free radical polymerization, it being possible to carry out the reaction correspondingly to stage (i) in a solvent or in the absence of a solvent.

In the novel process, the stages (i) and (ii) can be carried out separately from one another in terms of both space and time, stage (i) being carried out first, followed by stage (ii). Stages (i) and (ii) can also be carried out in succession in only one reaction vessel, i.e. at least one monomer (a) is first subjected, in the presence of a compound of the formula (I), to partial or complete free radical polymerization, depending on the desired use or the desired properties, and then at least one monomer (b) is added and is likewise subjected to a free radical polymerization.

In the present invention, it is however also possible for a monomer mixture comprising at least one monomer (a) and at least one monomer (b) to be used from the outset and to be reacted in the presence of the compound of the formula (I).

It is assumed that the compound of the formula (I) first reacts with the at least one monomer (a) and then the reaction product (A) formed therefrom also reacts with the monomer (b) above a specific molecular weight.

Depending on the reaction procedure, it is possible according to the invention to prepare polymers functionalized as terminal groups, block or multiblock and gradient (co)polymers, star polymers, graft copolymers and branched (co)polymers.

As is evident from the above, the present invention also relates to the polymer (B) per se, which can be prepared by the process defined above. The novel reaction is preferably carried out in such a way that a polymer (B) which has a block structure is obtained.

According to the invention, it is also envisaged that a polymer (B) is reacted in a further reaction stage (iii) with a further monomer (c), where the monomer (c) can likewise be chosen, for example, from the above list. The reaction is carried out as described for stages (i) and (ii). The novel process can accordingly be carried out with any desired number of stages which is essentially limited only by the reaction conditions and the material properties of the polymer formed and with any corresponding number of monomers. Accordingly, any desired block copolymers having a correspondingly large number of blocks or random copolymers comprising a corresponding number of different monomers can be obtained.

The present invention therefore also relates to a process for the preparation of a polymer (C), in which, as stage (iii) the reaction product (B) obtained in stage (ii) is reacted under free radical conditions in the presence of at least one monomer (c) capable of free radical homoplymerization or copolymerization, this reaction being repeated, if required, several times in succession with the same or different monomers (c).

According to the invention, it is possible in a simple manner, using an easily obtainable compound of the formula (I), to provide block copolymers which comprise, for example, a hydrophilic block, such as a (meth)acrylic acid block or a $C_{1-4}$-alkyl (meth)acrylate block, and a further, preferably hydrophobic polymer block, such as a block based on vinylaromatic monomers, e.g. styrene or substituted styrenes, and nonaromatic vinyl compounds, e.g. vinyl acetate and higher ($>C_4$) alkyl (meth)acrylates. In the present invention, it is however also possible, using the compound of the formula I, to provide block copolymers which comprise a hydrophobic and subsequently a hydrophilic block.

Within the scope of the present invention, it has been found that those monomers which have an electron-rich olefinically unsaturated double bond can also be subjected to free radical homopolymerization or copolymerization by the novel process. Examples of such compounds are the vinyl ethers, vinyl esters, for example vinyl acetate, or the N-vinyl compounds as mentioned above.

In the novel process, the monomers can be copolymerized essentially in any desired sequence without it being necessary, for example, to observe a specific sequence of hydrophilic and hydrophobic monomers.

According to the invention, polymers of the following structure can also be prepared:

Poly ((meth) acrylic acid-stat-(meth)acrylate-b-(styrene-stat-(meth)acrylate)), the term (meth)acrylate denoting alkyl esters of methacrylic acid and acrylic acid.

Specific examples are the following block copolymers:

Poly(styrene-b-acrylic acid), poly(styrene-b-methyl acrylate), poly(styrene-b-ethyl acrylate), poly-(styrene-b-methacrylic acid), poly(styrene-b-methyl methacrylate), poly(styrene-b-methyl methacrylate), poly(hydroxyethyl acrylate-b-methacrylic acid), poly(N-vinylpyrrolidone-b-methyl acrylate), poly(N-vinyl-pyrrolidone-b-ethyl acrylate), poly(N-vinylpyrrolidone-b-methyl methacrylate), poly(N-vinylpyrrolidone-b-ethyl methacrylate), poly(N-vinylpyrrolidone-b-styrene), poly(N-vinylpyrrolidone-b-vinyl acetate), poly(N-vinyl-pyrrolidone-b-α-methylstyrene), poly(N-vinylformamide-b-methyl methacrylate), poly(N-vinylformamide-b-ethyl methacrylate), poly(N-vinylformamide-b-vinyl acetate), poly(N-vinylformamide-b-methyl acrylate) or poly(N-vinylformamide-b-methyl acrylate).

Furthermore, the following can be prepared according to the present invention:

Poly(methyl methacrylate-b-(styrene-stat-acrylonitrile)), poly(n-butyl acrylate-b-styrene-b-n-butyl acrylate), poly(styrene-b-n-butyl acrylate-b-styrene), poly(styrene-b-n-butyl acrylate-b-styrene-b-n-butyl acrylate), poly(methyl methacrylate-b-styrene-b-methyl methacrylate-b-styrene), poly(n-butyl acrylate-b-styrene-b-n-butyl acrylate-b-styrene) and the like.

The Examples which follow illustrate the invention.

EXAMPLES

Example 1

A stock solution was prepared from 100 g of methyl methacrylate, 0.9 g of 1,1-diphenylethene and 0.55 g of azobisisobutyronitrile, and in each case 25 g of this monomer mixture were dissolved in 35 ml of cyclohexane (solutions A, B and C). The solutions were reacted according to the data in Table 1.

TABLE 1

| Polymer | Reaction temperature [° C.] | Reaction time [h] | $M_w$ [g/mol] |
|---|---|---|---|
| A | 90 | 1.5 | 23,400 |
| B | 80 | 6 | 29,200 |
| C | 70 | 22.5 | 55,300 |

The polymers A, B and C were obtained accordingly from the solutions A, B and C, and in the second step, 2 g each were reacted with 10 g of styrene in each case for 8 hours at 85° C. Table 2 shows the molecular weights and conversions of the block copolymers A2, B2 and C2 obtained.

TABLE 2

| Polymer | $M_w$ [g/mol] |
|---|---|
| A2 | 225,100 |
| B2 | 241,400 |
| C2 | 304,200 |

To remove any homopolystyrene present, the block copolymer was repeatedly precipitated in cyclohexane and extracted with hot cyclohexane in an ultrasonic bath. A mass loss of less than 5% was found. The IR spectrum of the purified block copolymer was recorded. Both monomers could be unambiguously found and hence the chemical linkage of the polymethyl methacrylate block and polystyrene block could be detected.

To check the procedure described, a physical mixture of homopolystyrene (2 g) and homopolymethyl methacrylate (1 g) was likewise precipitated in cyclohexane and extracted with hot cyclohexane in an ultrasonic bath. The mass loss was 93%. The IR spectrum recorded for the residue did not reveal any styrene.

Example 2

A stock solution was prepared from 100 g of methyl methacrylate, 0.9 g of 1,1-diphenylethene and 1.08 g of benzoyl peroxide, and in each case 25 g of this monomer mixture were dissolved in 35 ml of cyclohexane (solutions D and E). The solutions were reacted according to the data in Table 3.

TABLE 3

| Polymer | Reaction temperature [° C.] | Reaction time [h] | $M_w$ [g/mol] | Conversion [%] |
|---|---|---|---|---|
| D | 90 | 17.2 | 51,900 | 100 |
| E | 100 | 8 | 50,400 | 100 |

The polymers D and E were accordingly obtained from the solutions D and E. In a second step, 5 g each of the polymers D and E were reacted in each case with 20 g of styrene for 12 hours at 85° C. Table 4 shows the molecular weights and conversions for the block copolymers D2 and E2 obtained.

TABLE 4

| Polymer | $M_w$ [g/mol] |
|---|---|
| D2 | 341,800 |
| E2 | 435,900 |

Example 3

100 g of methyl methacrylate were dissolved with 0.9 g of 1,1-diphenylethene (solution F), 0.5 g of 1,1-diphenylethene (solution G) or 0.4 g of 1,1-diphenylethene (solution H) and in each case 0.16 g of azobisisobutyronitrile in 140 ml of cyclohexane and heated for 1.5 hours or 6 hours at 90° C. After the polymerization, the polymers were taken up in THF and precipitated in methanol. The results are listed in Table 5.

TABLE 5

| Solution | Reaction time [h] | Polymer | $M_w$ [g/mol] |
|---|---|---|---|
| F | 1.5 | F (1.5) | 87,100 |
| F | 6 | F (6) | 177,300 |
| G | 1.5 | G (1.5) | 116,300 |
| G | 6 | G (6) | 279,700 |
| H | 1.5 | H (1.5) | 135,200 |
| H | 6 | H (6) | 296,300 |

0.5 g each of the polymers F to H obtained were then reacted in each case with 10 g of styrene for 12 hours at 85° C. The block copolymers were dissolved in THF and precipitated in methanol. Table 6 shows the molecular weights and conversions of the block copolymers F2 to G2 obtained.

TABLE 6

| Polymer | $M_w$ [g/mol] |
|---|---|
| F (1.5) 2 | 340,600 |
| F (6) 2 | 412,200 |
| G (1.5) 2 | 381,300 |
| G (6) 2 | 380,100 |
| H (1.5) 2 | 398,000 |
| H (6) 2 | 361,400 |

Example 4

25 g of methyl methacrylate (solution I) or 26.03 g of styrene (solution J) were dissolved together with 0.2 g of 1,1-diphenylethene and 0.14 g of azobisisobutyronitrile in 35 ml of the solvent stated in Table 7 and then kept at 85° C. for 12 hours. After the polymerization, the polymers were taken up in THF and precipitated in methanol.

TABLE 7

| Solution | Solvent | Polymer | $M_w$ [g/mol] |
|---|---|---|---|
| I | Cyclohexane | I (C) | 49,900 |
| I | Methyl ethyl ketone | I (M) | 29,400 |
| I | Dioxane | I (D) | 34,200 |
| J | Cyclohexane | J (C) | 32,200 |
| J | Methyl ethyl ketone | J (M) | 21,500 |
| J | Dioxane | J (D) | 37,900 |

5 g each of the polymers I were then dissolved in 20 g of styrene and kept at 110° C. for 6 hours. 2.5 g each of the polymers J were dissolved in 10 g of methyl methacrylate and likewise kept at 110° C. for 6 hours. The polymers I2 and J2 were then taken up in THF and precipitated in methanol (cf. Table 8).

TABLE 8

| Polymer | $M_w$ [g/mol] |
|---------|---------------|
| I (C) 2 | 140,500 |
| I (M) 2 | 173,400 |
| I (D) 2 | 139,800 |
| J (C) 2 | 519,400 |
| J (M) 2 | 618,300 |
| J (D) 2 | 610,500 |

Example 5

In each case 1 g of the polymer J (M) described in Example 4 was dissolved in each case in 10 g of the monomer stated in Table 9 and heated at 110° C. for 6 hours.

TABLE 9

| Monomer 2 | Increase of monomer 2 [g] |
|-----------|---------------------------|
| N-Vinylpyrrolidone | 10 |
| Methyl methacrylate | 92 |

Example 6

In each case 3.4 g of the polymer E described in Example 2 were dissolved in 13.6 g of methyl methacrylate and heated to 85° C. After the reaction times stated in Table 10, the polymerization was stopped and the product was taken up in THF and precipitated in methanol.

TABLE 10

| Reaction time [h] | $M_w$ [g/mol] | Mass increase of the polymer [%] |
|---|---|---|
| 4 | 134,500 | 36 |
| 12 | 333,500 | 76 |
| 24 | 396,600 | 129 |

Example 7

99.99 g of N-vinylpyrrolidone, 0.8 g of 1,1-diphenylethene and 0.49 g of azobisisobutyronitrile were heated at 85° C. for 6 hours. The polymer K obtained was taken up in THF and precipitated in diethyl ether.

0.5 g of the polymer K was dissolved in 10 g of styrene and heated at 110° C. for 6 hours. The increase in the mass of styrene was 1 g. The block structure of the polymer was detected by extraction experiments or precipitation in methanol and water and subsequent IR spectroscopic investigation of the purified product. In the IR spectrum, both the signals of styrene units and those of the N-vinylpyrrolidone units are visible.

We claim:

1. A process for the preparation of a reaction product (A), which comprises the following stage:
   reacting, under free radical conditions, a reaction mixture consisting of
   at least one monomer (a) capable of free radical polymerization,
   at least one free radical initiator, selected from the from consisting of 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl]-propionamide, 2,2'-azobis(N,N'-dimethyleneisobutyramidine) dihydrochloride, 2,2'-azobis(2-amidinopropane) dihydrochloride, 2,2'-azobis(N, N'-dimethyleneisobutyramine), 2,2'azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide]2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite and dicumyl hyponitrite,
   a compound of the formula (I),

(I)

where $R_1$ to $R_4$, independently of one another, are each hydrogen, an alkyl radical, a cycloalkyl radical or an aralkyl radical, each of which may be unsubstituted or substituted, or an unsubstituted or substituted aromatic hydrocarbon radical, wherein at least two of the radicals $R_1$ to $R_4$ are an unsubstituted or substituted aromatic hydrocarbon radical, or $R_1$ and $R_2$, or $R_3$ and $R_4$, in each case in pairs, are a substituted or unsubstituted aromatic hydrocarbon having 6 to 18 carbon atoms and a functional group which, in conjugation with the C—C double bond in the formula I, has a multiple bond between a carbon atom and a heteroatom, water in an amount of 0 to 10% by weight based on the weight of the reaction mixture, and at least one solvent.

2. The process as claimed in claim 1, wherein the reaction is carried out at from 1 to 300 bar.

3. The process as claimed in claim 2, wherein the amount of free radical initiator is from 0.5 to 50% by weight, based on the total amount of the initiator and of the monomer (a).

4. The process as claimed in claim 3, wherein the compound of formula (I) is at least one selected from the group consisting of diphenylethylene, an alkoxydiphenylethylene, dinaphthylethylene, 4,4-vinylidenebis(N,N-dimethylaniline), 4,4-vinylidenebis(1-amino-benzene), cis-stilbene, trans-stilbene, methyl α-phenylacrylate, methyl α-phenylmethacrylate, α-phenylacrylonitrile, and α-phenylmethacrylonitrile.

5. The process as claimed in claim 4, wherein the reaction mixture consists of at least one first monomer (a), selected from the group consisting of styrene, acrylic acid, methacrylic acid, a $C_1$- to $C_4$-alkyl or $C_1$–$C_4$-hydroxyalkyl acrylate or methacrylate, vinyl acetate, a substituted vinyl pyrrolidone, unsubstituted vinylpyrrolidone, and a mixture of the first monomer (a) with at least one further monomer capable of free radical homopolymerization or copolymerization.

6. The process as claimed in claim 5, wherein water is present in an amount of 5% by weight or less in the reaction mixture during the reaction.

7. A process for the preparation of a polymer (B), comprising
reacting a reaction product (A) obtained by the process according to claim 1 under free radical conditions in the presence of at least one monomer (b) capable of free radical homopolymerization or copolymerization.

8. A process for the preparation of a polymer (C), comprising
reacting a reaction product (B) obtained by the process according to claim 7 under free radical conditions in the presence of at least one monomer (c) capable of free radical homopolymerization or copolymerization.

9. A reaction product (A) obtained by:
reacting under free radical conditions, a reaction mixture consisting of
at least one monomer (a) capable of free radical polymerization,
at least one free radical initiator, selected from the group consisting of 2,2'-azobis(isobutyronitrile), 2,2'-azobis (2-cyano-2-butane), dimethyl 2,2'-azobisdimethylisobutyrate, 4,4'-azobis(4-cyanopentanoic acid), 1,1'-azobis (cyclohexanecarbonitrile), 2-(t-butylazo)-2-cyanopropane, 2,2'-azobis[2-methyl-N-(1,1)-bis (hydroxymethyl)-2-hydroxyethyl]propionamide, 2,2'-azobis[2-methyl-N-hydroxyethyl)]1-propionamide, 2,2'-azobis(N,N'-dimetlyleneisobutyramidine) dihydrochloride, 2,2'-azobis(2-amidinopropane) dihydrochloride, 2,2'-azobis(N,N'-dimethyleneisobutyramine), 2,2'azobis(2-methyl-N-[1,1-bis (hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis (isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hynonitrite and dicumyl hyponitrite,
a compound of the formula (I)

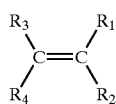

(I)

where $R_1$ to $R_4$, independently of one another, are each hydrogen, an alkyl radical, a cycloalkyl radical, or an aralkyl radical, each of which may be unsubstituted or substituted, an unsubstituted or substituted aromatic hydrocarbon radical, wherein at least two of the radicals $R_1$ to $R_4$ are an unsubstituted or substituted aromatic hydrocarbon radical,
water in an amount of 0 to 10% by weight based on the weight of the reaction mixture, and
at least one solvent.

10. A polymer (B) prepared by the process as claimed in claim 7.

11. The polymer (B) as claimed in claim 10, having a structure selected from the group consisting of poly(acrylic acid-b-styrene), poly(methyl methacrylate-b-styrene), poly (methacrylic acid-b-hydroxyethyl acrylate), poly(methyl methacrylate-b-N-vinylpyrrolidone), poly(methyl methacrylate-b-N-vinylformamide), poly(methyl methacrylate-b- hydroxyethyl acrylate), poly(methyl methacrylate-b-(styrene-stat-acrylonitrile)), poly(n-butyl acrylate-b-styrene-b-n-butyl acrylate), poly(methyl methacrylate-b- styrene-b-methyl methacrylate-b-styrene), and poly(n-butyl acrylate-b-styrene-b-n-butyl acrylate-b-styrene).

12. A polymer (B) prepared by the process as claimed in claim 8.

13. The polymer (B) as claimed in claim 12, having a structure selected from the group consisting of poly(acrylic acid-b-styrene), poly(methyl methacrylate-b-styrene), poly (methacrylic acid-b-hydroxyethyl acrylate), poly(methyl methacrylate-b-N-vinylpyrrolidone), poly(methyl methacrylate-b-N-vinylformamide), poly(methyl methacrylate-b- hydroxyethyl acrylate), poly(methyl methacrylate-b-(styrene-stat-acrylonitrile)), poly(n-butyl acrylate-b-styrene-b-n-butyl acrylate), poly(methyl methacrylate-b- styrene-b-methyl methacrylate-b-styrene), and poly(n-butyl acrylate-b-styrene-b-n-butyl acrylate-b-styrene).

14. The process as claimed in claim 7, further comprising
repeating reacting the reaction production (B) with the same or different monomers (c).

15. A polymer prepared by the process as claimed in claim 14.

16. The polymer as claimed in claim 15, having a structure selected from the group consisting of poly(acrylic acid-b-styrene), poly(methyl methacrylate,b-styrene), poly (methacrylic acid-b-hydroxyethyl acrylate), poly(methyl methacrylate-b-N-vinylpyrrolidone), poly(methyl methacrylate-b-N-vinylformamide), poly(methyl methacrylate-b- hydroxyethyl acrylate), poly(methyl methacrylate-b-(styrene-stat-acrylonitrile)), poly(n-butyl acrylate-b-styrene-b-n-butyl acrylate), poly(methyl methacrylate-b- styrene-b-methyl methacrylate-b-styrene), and poly(n-butyl acrylate-b-styrene-b-n-butyl acrylate-b-styrene).

17. A polymer (C) prepared by the process as claimed in claim 15.

18. The process as claimed in claim 1, wherein water is present in the reaction mixture during the reaction in an amount of 0 to 0.1% by weight.

19. The process as claimed in claim 1, wherein water is present in the reaction mixture during reaction in an amount of 0 to 0.001% by weight or less.

20. The process as claimed in claim 1, wherein no water is present in the reaction mixture during reaction.

21. A process for the preparation of a reaction product (A), which comprises the following stage:
reacting, under free radical conditions, a reaction mixture consisting of
at least one monomer (a) capable of free radical polymerization, at least one free radical initiator, selected from the group consisting of 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramine), 2,2'azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite and dicumyl hyponitrite, a compound of the formula (I),

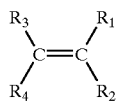

(I)

where $R_1$ to $R_4$, independently of one another, are each hydrogen, an alkyl radical, a cycloalkyl radical or an aralkyl radical, each of which may be unsubstituted or substituted, or an unsubstituted or substituted aromatic hydrocarbon radical, wherein at least two of the radicals $R_1$ to $R_4$ are an unsubstituted or substituted aromatic hydrocarbon radical, or $R_1$ and $R_2$, or $R_3$ and $R_4$, in each case in pairs, are a substituted or unsubstituted aromatic hydrocarbon having 6 to 18 carbon atoms and a functional group which, in conjugation with the C—C double bond in the formula I, has a multiple bond between a carbon atom and a heteroatom, and water in an amount of 0 to 10% by weight based on the weight of the reaction mixture.

22. The process as claimed in claim 21, wherein the reaction is carried out at from 1 to 300 bar.

23. The process as claimed in claim 22, wherein the amount of free radical initiator is from 0.5 to 50% by weight, based on the total amount of the initiator and of the monomer (a).

24. The process as claimed in claim 23, wherein the compound of formula (I) is at least one selected from the group consisting of diphenylethylene, an alkoxydiphenylethylene, dinaphthylethylene, 4,4-vinylidenebis(N,N-dimethylaniline), 4, 4-vinylidenebis(1-amino-benzene), cis-stilbene, trans-stilbene, methyl α-phenylacrylate, methyl α-phenylmethacrylate, α-phenylacrylonitrile, and α-phenylmethacrylonitrile.

25. The process as claimed in claim 24, wherein the reaction mixture the first monomer (a) is at least one selected from the group consisting of styrene, acrylic acid, meth-acrylic acid, a $C_1$- to $C_4$-alkyl or $C_1$–$C_4$-hydroxyalkyl acrylate or methacrylate, vinyl acetate, a substituted vinyl pyrrolidone, unsubstituted vinylpyrrolidone, and a mixture of the first monomer (a) with at least one further monomer capable of free radical homopolymerization or copolymerization.

26. The process as claimed in claim 25, wherein water is present in an amount of 5% by weight or less in the reaction mixture during the reaction.

27. A process for the preparation of a polymer (B), comprising reacting a reaction product (A) obtained by the process according to claim 21 under free radical conditions in the presence of at least one monomer (b) capable of free radical homopolymerization or copolymerization.

28. A process for the preparation of a polymer (C), comprising reacting a reaction product (B) obtained by the process according to claim 27 under free radical conditions in the presence of at least one monomer (c) capable of free radical homopolymerization or copolymerization.

29. A reaction product (A) obtained by:

reacting under free radical conditions, a reaction mixture consisting of at least one monomer (a) capable of free radical polymerization, at least one free radical initiator, selected from the group consisting of 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N'- dimethyleneisobutyramine), 2,2'azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyraxnide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-aniyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite and dicumyl hyponitrite, a compound of the formula (I)

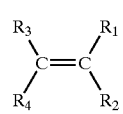

(I)

where $R_1$ to $R_4$, independently of one another, are each hydrogen, an alkyl radical, a cycloalkyl radical, or an aralkyl radical, each of which may be unsubstituted or substituted, an unsubstituted or substituted aromatic hydrocarbon radical, wherein at least two of the radicals $R_1$ to $R_4$ are an unsubstituted or substituted aromatic hydrocarbon radical, and water in an amount of 0 to 10% by weight based on the weight of the reaction mixture.

30. A polymer (B) prepared by the process as claimed in claim 29.

31. The polymer (B) as claimed in claim 30, having a structure selected from the group consisting of poly(acrylic acid-b-styrene), poly(methyl methacrylate-b-styrene), poly(methacrylic acid-b-hydroxyethyl acrylate), poly(methyl methacrylate-b-N-vinylpyrrolidone), poly(methyl methacrylate-b-N-vinylformamide), poly(methyl methacrylate-b-hydroxyethyl acrylate), poly(methyl methacrylate-b-(styrene-stat-acrylonitrile)), poly(n,butyl acrylate-b-styrene-b-n-butyl acrylate), poly(methyl methacrylate-b-styrene-b-methyl methacrylate-b-styrene), and poly(n-butyl acrylate-b-styrene-b-n-butyl acrylate-b-styrene).

32. A polymer (B) prepared by the process as claimed in claim 28.

33. The polymer (B) as claimed in claim 32, having a structure selected from the group consisting of poly(acrylic acid-b-styrene), poly(methyl methacrylate-b-styrene), poly(methacrylic acid-b-hydroxyethyl acrylate), poly(methyl methacrylate-b-N-vinylpyrrolidone), poly(methyl methacrylate-b-N-vinylformamide), poly(methyl methacrylate-b-hydroxyethyl acrylate), poly(methyl methacrylate-b-(styrene-stat-acrylonitrile)), poly(n-butyl acrylate-b-styrene-b-n-butyl acrylate), poly(methyl methacrylate-b-styrene-b-methyl methacrylate-b-styrene), and poly(n-butyl acrylate-b-styrene-b-n-butyl acrylate-b-styrene).

34. The process as claimed in claim 27, further comprising repeating reacting the reaction production (B) with the same or different monomers (c).

35. A polymer prepared by the process as claimed in claim 34.

36. The polymer as claimed in claim 35, having a structure selected from the group consisting of poly(acrylic acid-b-styrene), poly(methyl methacrylate-b-styrene), poly(methacrylic acid-b-hydroxyethyl acrylate), poly(methyl methacrylate-b-N-vinylpyrrolidone), poly(methyl methacrylate-b-N-vinylformamide), poly(methyl methacrylate-b- hydroxyethyl acrylate), poly(methyl methacrylate-b-(styrene-stat-acrylonitrile)), poly(n-butyl acrylate-b-styrene-b-n-butyl acrylate), poly(methyl methacrylate-b-styrene-b-methyl methacrylate-b-styrene), and poly(n-butyl acrylate-b-styrene-b-n-butyl acrylate-b-styrene).

37. A polymer (C) prepared by the process as claimed in claim 35.

38. The process as claimed in claim 21, wherein water is present in the reaction mixture during the reaction in an amount of 0 to 0.1% by weight.

39. The process as claimed in claim 21, wherein water is present in the reaction mixture during reaction in an amount of 0 to 0.001% by weight or less.

40. The process as claimed in claim 21, wherein no water is present in the reaction mixture during reaction.

* * * * *